United States Patent
Abramovici et al.

(10) Patent No.: US 6,389,298 B1
(45) Date of Patent: May 14, 2002

(54) SIGNALING TO SUPPORT WIRELESS SERVICE REDIRECTION

(75) Inventors: Gabriela Maria Abramovici, Berkeley Heights, NJ (US); Michael Dwayne Chambers, Plainfield, IL (US); Yuen-Yin L. Koo, Morristown; Semyon B. Mizikovsky, Morganville, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/228,266

(22) Filed: Jan. 11, 1999

(51) Int. Cl.$^7$ ............................. H04B 7/38; H04M 1/00
(52) U.S. Cl. ........................................ 455/552; 455/420
(58) Field of Search ........................ 455/434, 414, 455/515, 70, 426, 466, 552, 553, 418–420; 370/342

(56) References Cited

U.S. PATENT DOCUMENTS

| | | | | |
|---|---|---|---|---|
| 5,506,886 A | * | 4/1996 | Maine et al. ............... | 455/31.3 |
| 5,664,004 A | * | 9/1997 | Durchman et al. .......... | 455/466 |
| 5,878,038 A | * | 3/1999 | Willey ....................... | 370/335 |
| 5,926,470 A | * | 7/1999 | Tiedemann, Jr. ............ | 370/334 |
| 6,044,069 A | * | 3/2000 | Wan .......................... | 370/311 |
| 6,058,108 A | * | 5/2000 | Raith et al. ................. | 370/337 |
| 6,058,309 A | * | 5/2000 | Huang et al. ............... | 455/433 |
| 6,078,572 A | * | 6/2000 | Tanno et al. ................ | 370/335 |
| 6,097,949 A | * | 8/2000 | Jung et al. .................. | 455/426 |
| 6,138,034 A | * | 10/2000 | Willey ........................ | 455/522 |

FOREIGN PATENT DOCUMENTS

| | | | |
|---|---|---|---|
| DE | 19834674 A | 2/2000 | ............ H04Q/7/38 |
| GB | 2173377 A | 10/1986 | ............ H04B/7/26 |
| WO | WO 94 13069 A | 6/1994 | ............ H04B/7/26 |
| WO | WO 95/12936 | 5/1995 | ............ H04J/3/16 |
| WO | WO 98/59513 | 12/1998 | ............ J04Q/7/38 |

OTHER PUBLICATIONS

Traffic Capacity of Cellular Mobile Communications Systems, David Everitt, computer Networks and ISDN Systems, NL, North Holland Publishing, Amsterdam, vol. 20, No. 1/05, Dec. 1, 1990, pp. 447–454.

* cited by examiner

Primary Examiner—Nguyen T. Vo

(57) ABSTRACT

A selective Global Service Redirection mechanism allows a service provider, for instance, to instruct only CDMA2000 (MOB_P_REV=6) mobiles to access specific carrier that is deployed to support advanced services known as 3G services. In another embodiment, data-only CDMA2000 mobiles are instructed to access specific carrier that is optimized to support high speed data services. Additionally, data-only CDMA2000 mobiles may be instructed to access a specific carrier that is optimized to support high speed data services. Pre-CDMA2000 mobiles (MOB_P_REV<6) are redirected by a conventional Global Service Redirection Message to another carrier, while CDMA2000 mobiles (MOB_P_REV=>6) are instructed to ignore this redirection.

1 Claim, 1 Drawing Sheet

| GLOBAL_REDIRECT | EXT_GLOBAL_REDIRECT | PROCEDURES |
|---|---|---|
| 1 | 1 | GSRM USED FOR MOD_P_REV < 6<br>EGSRM USED FOR MOB_P_REV ≥ 6 |
| 1 | 0 | GSRM USED FOR ALL MS |
| 0 | 1 | EGSRM USED FOR MOB_P_REV ≥ 6 |
| 0 | 0 | NO REDIRECTION |

| GLOBAL_REDIRECT | EXT_GLOBAL_REDIRECT | PROCEDURES |
|---|---|---|
| 1 | 1 | GSRM USED FOR MOD_P_REV < 6<br>EGSRM USED FOR MOB_P_REV $\geq$ 6 |
| 1 | 0 | GSRM USED FOR ALL MS |
| 0 | 1 | EGSRM USED FOR MOB_P_REV $\geq$ 6 |
| 0 | 0 | NO REDIRECTION |

SIGNALING TO SUPPORT WIRELESS SERVICE REDIRECTION

BACKGROUND OF THE INVENTION

1. Field of the Invention

The present invention is related to communications; more particularly, the redirection of mobile station's communications.

2. Description of the Prior Art

With the Global Service Redirection mechanism currently defined in IS-95B (the telecommunications standard IS95B is hereby incorporated by reference), a base station can redirect mobile stations of the selected subscriber Access Control Overload class (ACCOLC) or classes to a specific CDMA carrier or the analog system. This mechanism can be used by service providers to control CDMA subscriber access to their system for some special situations, for example when deploying a new system and during potential system overload situations.

As more CDMA protocols are being developed, the current Global Service Redirection mechanism is insufficient to meet the need of those service providers who want to control global subscriber access effectively with some new attributes.

SUMMARY OF THE INVENTION

The present invention provides, in addition to ACCOLC, the use two new attributes for Global Service Redirection, which are mobile station protocol revision (MOB_P_REV) and desired service type (specifically data, voice, and SMS, etc), without excluding other potential attributes.

Hence, Global Service Redirection mechanism becomes more selective, allowing service provider, for instance, to instruct only CDMA2000 (MOB_P_REV=6) mobiles to access specific carrier that is deployed to support advanced services known as 3G services. The Telecommunications Industry Association (TIA) CDMA2000 (MOB_P_REV= 6) standard is hereby incorporated by reference.

In another embodiment, data-only CDMA2000 mobiles are instructed to access specific carrier that is optimized to support high speed data services.

In yet another embodiment, pre-CDMA2000 mobiles (MOB_P_REV<6) are redirected by a conventional Global Service Redirection Message to another carrier, while CDMA2000 mobiles (MOB_P_REV=>6) are instructed to ignore this redirection.

In an embodiment used for a test deployment application, mobile stations of specific Access Overload Class (ACCOLC) corresponding to a particular revision level (MOB_P_REV) can be redirected to a carrier that supports the test.

DETAILED DESCRIPTION OF THE INVENTION

Figures 1, 2:
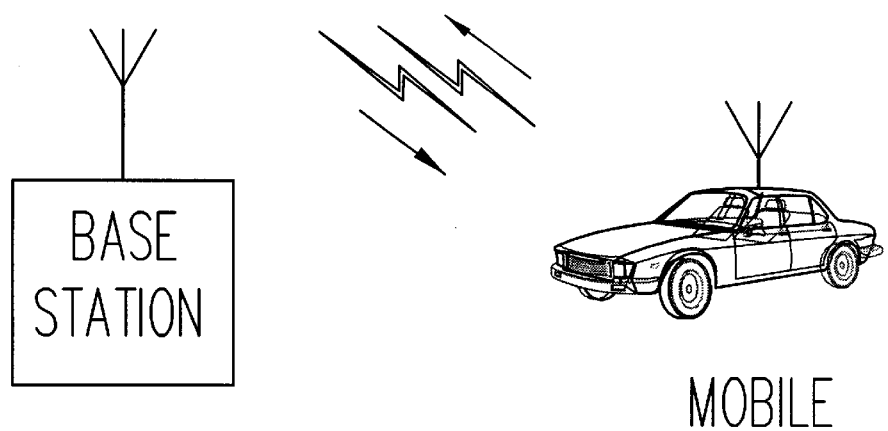
FIG. 1 illustrates a base station and a mobile station.
FIG. 2 is a table showing the procedures associated with GSRM and EGSRM messages.

This invention provides an easily implementable, flexible and backward compatible solution for the 3G capable base station to redirect mobile stations to a specific CDMA carrier or the analog system. FIG. 1 illustrates a base station and a mobile station.

The base station may redirect mobile stations with the following criteria:

ACCOLC: multiple ACCOLC classes can be selected.

Protocol Revision: a given protocol, a range of protocol revisions.

Service type: all services with an exception, or a specific service such as voice, data, or SMS, etc.

A new message—Extended Global Service Redirection Message (EGSRM)—is transmitted on the overhead message train by the 3G capable base station as needed. This new message will affect the 3G mobile stations only (i.e., mobile stations with protocol revision (MOB_P_REV) equal to or greater than 6).

The base station will indicate in the System Parameter Message (or the Extended System Parameter Message as the alternate option) whether or not this new overhead message (EGSRM) is to be sent. When EGSRM is sent, the 3G capable mobile stations will use this message instead of a Global Service Redirection Message, which might be sent as well. The 2G or less advanced mobile stations will use the Global Service Redirection Message as usual.

Using the protocol revision attribute, the infrastructure can indicate that it intends to serve only mobile stations of a specific protocol revision, or not to serve mobile stations in a specified range of protocol revisions.

With the service type attribute, the infrastructure can indicate that it intends to provide a specific type of service on a given CDMA carrier, or not to provide any particular type of service on a given CDMA carrier.

The following are the changes to the current CDMA2000 signaling to support this invention:

Provide a new Extended Global Service Direction Message (EGSRM) to contain, in addition to the information provided in the Global Service Redirection Message (GSRM) currently defined in the IS-95B, the following information:

The protocol revision, or a range of protocol revisions, of which the mobile stations of the selected ACCOLC class/classes are to be redirected.

Service type being redirected: all with an exception or a specific type of service (such as voice, data, SMS, or reserve type for future expansion)

Provide a new indicator or bit (EXT_GLOBAL_REDIRECT) in the System Parameter Message to indicate whether or not the Extended Global Service Redirection Message is being sent.

The following rules or procedures are used to determine how GSRM and EGSRM messages are used by all mobile stations including the old and new:

If both the GLOBAL_REDIRECT and EXT_GLOBAL_REDIRECT bits or indicators are set to '1' (or ACTIVE STATE),
  –The mobile stations with MOB_P_REV equal to or greater than 6 will be instructed by the Extended Global Redirection Message (EGSRM).
    +The mobile stations of selected ACCOLC with MOB_P_REV in the range (DIRECT_P_MIN to DIRECT_P_MAX inclusive) will be redirected by the EGSRM
  –The mobile stations with MOB_P_REV less than 6 will be instructed by the Global Service Redirection Message (GSRM).

If GLOBAL_REDIRECT bit is set '1' and EXT_GLOBAL_REDIRECT is set to '0', all mobile stations will be redirected by the Global Service Redirection Message (GSRM) as today.

If EXT_GLOBAL_REDIRECT is set to '1' and GLOBAL_REDIRECT is set to '0', only mobile stations with MOB_P_REV equal to or greater than 6 will be redirected by the EGSRM.

When both GLOBAL_REDIRECT and EXT_GLOBAL_REDIRECT are set to '0', there is no global service redirection.

FIG. 2 is a table summarizes the rules stated above.

The invention claimed is:

1. A method for selectively redirecting a first group of mobile telecommunications stations and a second group of mobile telecommunications stations to seek communication services on a particular carrier signal, comprising the steps of:

providing a first and a second carrier signal;

transmitting a first redirection message;

transmitting a second redirection message, where the first redirect message redirects the group of mobile telecommunications stations to a particular carrier signal and the second redirect message redirects the second group of mobile telecommunications stations, transmitting a first indicator that signals a first redirection message is being transmitted; and transmitting a second indicator that signals a second redirection message is being transmitted, wherein the first indicator is inactive and the second indicator is active when the second redirect message is being transmitted to redirect the first and second groups of mobile telecommunications stations.

* * * * *